(12) United States Patent
Lindeberg et al.

(10) Patent No.: US 8,090,470 B2
(45) Date of Patent: Jan. 3, 2012

(54) METHOD AND SYSTEM FOR OPTIMIZING CONTAINERS IN A BLOCK

(75) Inventors: Erik Lindeberg, Nyköping (SE); Claes Heidenback, Vasteras (SE); Bjorn Henriksson, Vasteras (SE); Alf Isaksson, Vasteras (SE); Stefan Israelsson Tampe, Vasteras (SE)

(73) Assignee: ABB Research Ltd. (CH)

( * ) Notice: Subject to any disclaimer, the term of this patent is extended or adjusted under 35 U.S.C. 154(b) by 717 days.

(21) Appl. No.: 12/142,596

(22) Filed: Jun. 19, 2008

(65) Prior Publication Data

US 2008/0319573 A1      Dec. 25, 2008

(30) Foreign Application Priority Data

Jun. 19, 2007   (EP) ..................... 07110565

(51) Int. Cl.
*G06F 7/00* (2006.01)
*G06F 19/00* (2011.01)
*G05B 19/05* (2006.01)
*G05B 19/18* (2006.01)

(52) U.S. Cl. ........ 700/213; 700/214; 700/217; 700/220; 700/245; 700/246; 700/253; 414/139.9; 414/140.3

(58) Field of Classification Search .................. None
See application file for complete search history.

(56) References Cited

U.S. PATENT DOCUMENTS

| | | | |
|---|---|---|---|
| 6,826,452 B1 * | 11/2004 | Holland et al. ............... | 700/245 |
| 2006/0182527 A1 | 8/2006 | Ranstrom et al. | |
| 2006/0251498 A1 * | 11/2006 | Buzzoni et al. ............ | 414/139.9 |

OTHER PUBLICATIONS

Yusin Lee, An Optimization Model for the Container Pre--Marshalling Problem, pp. 3296-3301, Department of Civil Engineering, National Cheng Kung University, Feb. 2006, available at www.sciencedirect.com.*

Thurston T. et al.; "Distributed Agent Architecture for Port Automation" Proceedings of the 26th.Annual International Computer Software and Applications Conference, COMPSAC 2002, Oxford, England, Aug. 26-29, 2002 Annual International Computer Software and Applications Conference, Los Alamitos, CA, IEEE COMP. SOC, US, vol. CONF. 26, Aug. 26, 2002, pp. 81-87.

(Continued)

*Primary Examiner* — Gene Crawford
*Assistant Examiner* — Yolanda Cumbess
(74) *Attorney, Agent, or Firm* — St. Onge Steward Johnston & Reens LLC

(57) ABSTRACT

A method for optimizing the position of a plurality of containers in a block, including at least one crane configured to move the containers is provided. A crane control unit (CCU) is provided in which the following steps are performed: identifying a selected container to be moved from a current position CP within a sub-section of said block to a new position NP within the sub-section; calculating a number of container moves required facilitating the move of the selected container in previous step; arranging the required number of container moves in a queue for each crane; and performing the container moves as arranged in the queue by controlling said at least one crane. Also provided is a computer program, a computer-readable medium encoded with the computer program, and a system for optimizing the position of a plurality of containers in a block.

36 Claims, 4 Drawing Sheets

OTHER PUBLICATIONS

Duinkerken M. B. et al; Institute of Electrical and Electronics Engineers: "The Application of Distributed Simulation in TOMAS: Redesigning a Complex Transportation Model", Proceedings of the 2002 Winter Simulation Conference, WSC'02, San Diego, CA, Dec. 8-11, 2002, Winter Simulation Conference, New York, NY, IEEE, US, vol. 1 of 2, Conf. 35, Dec. 8, 2002, pp. 1207-1213.

Database Compendex [online], Engineering Information, Inc., New York, NY, US; Nov. 2007, Lee Yusin et al: "An Optimization Model for the Container Pre-Marshalling Problem" XP002461092 Database Accession No.E20071410533503, Available on Line Feb. 24, 2006, Abstract & Comp. Oper. Res.; Computers and Operations Research Nov. 2007, Online, vol. 34, No. 11, Nov. 2007, pp. 3295-3313, Retrieved on Nov. 28, 2007.

European Search Report, Dec. 5, 2007, 4 pages.

* cited by examiner

METHOD AND SYSTEM FOR OPTIMIZING
CONTAINERS IN A BLOCK

CROSS-REFERENCE TO RELATED
APPLICATIONS

The present application claims priority of European patent application No. 07 11 0565.4 filed on Jun. 19, 2007, the content of which is incorporated herein by reference.

FIELD OF THE INVENTION

The present invention relates to a method for optimizing the position of a plurality of containers in a block, especially a container block in a container port. The invention is also related to software and a system configured to perform said optimization.

BACKGROUND OF THE INVENTION

A very large part of all traded goods in the world is transported over sea by container ships. The ever increasing amount of international trade results in higher demands of container terminals all over the world to process (import/store/export) more goods with an increased speed. The demand on increased throughput capacity of container terminals often implies making very expensive investments. Such investments could be in terms of larger blocks (if even possible) and more cranes, other transport vehicles and complex and expensive computer systems. The reason for this is to be able to serve more import/export activities, and the resulting intermediate storage without incurring longer, costly delays in either end. For many small to medium sized terminals such investments might be too large to bear. Improved planning and handling of the storage blocks in a terminal has a great potential to increase the overall terminal throughput since this part is often a bottleneck in the whole inter modal transport system.

A system to optimize the block handling operations could increase the capacity of terminals too small to afford the high investment costs of large facility improvements. In addition, larger terminals could of course also benefit from a system that increases their capacity and effectiveness.

The traditional solution is to have a logistics system for the entire port handling all blocks and loading/unloading of the ships. The port logistics system determines in which block a certain container should be stored and communicates this information to a crane control system that inserts the container in the appropriate block. The export of a specific container is ordered by the port logistics system and the information is communicated to the crane control system for the appropriate block and the specific container is removed from the block where it has been stored.

In the published US application US2006/0182527, by Ranstrom et al., a system has been disclosed in a port logistics system which controls the movements of containers within each block by assigning orders to the cranes to perform a specific task.

A drawback of the prior art system is that only the port logistics system has an overall picture of each block and the crane available for moving the containers within each block performs the assigned orders whenever the port logistics system detects a container to move to a more favorable position. A small port without an expensive port logistics system having only one or a few container blocks will lack the possibility to use the unused capacity of the crane to optimize the position of each container within the block.

Another drawback is that each crane performs the assigned orders in the order they are assigned to the crane, which may introduce extensive crane motion before the next assigned order may be expedited.

Thus, there is a need to provide an improved system for optimizing the position of each container in a block without the presence of a port logistics system.

SUMMARY OF THE INVENTION

An object of the present invention is to provide a method that provides an optimization process for the stored containers in a block which reduces the drawbacks of the prior art systems.

In this invention we propose a more decentralized approach where the crane control system in a block takes care of the container storage optimization for this block. The port logistics system (if present) still determines in which block a certain container should be stored and communicates with the local block optimization system, called crane control unit. The crane control unit has three major tasks. It should optimize:
  container insert, i.e. find an optimal placement for new containers whether delivered by land or by sea
  container removal, i.e. in shortest possible time remove a container from the block
  container re-stacking, i.e. during times of low crane load relocate containers to more favourable positions The crane control calculates required container moves to handle these tasks and in order to make it efficient, a queue of container moves is assigned to each crane. The content of the queue, i.e. the order of the container moves, are reviewed and the queue rearranged in such a way to reduce the time needed to perform the tasks.

In all these tasks the optimization takes a number of issues into account, such as:
  the actual or estimated time of removal for containers that are moved
  to which position the container will eventually be delivered. In particular if it is to be transported next by land or by sea
  the type and size of container An advantage with the present invention is that the crane capacity is better used compared to prior art solutions.

Another advantage is that an optimization of a container block may be achieved even though a port logistics system is not present.

Still another advantage with the present invention is that the operating speed of the cranes may be reduced, in order to reduce wear and energy consumptions, since the crane control unit has a more complete knowledge compared to prior art systems.

Additional objects and advantages will become apparent for a skilled person in the art from the detailed description.

DETAILED DESCRIPTION OF THE INVENTION

Figure 1:
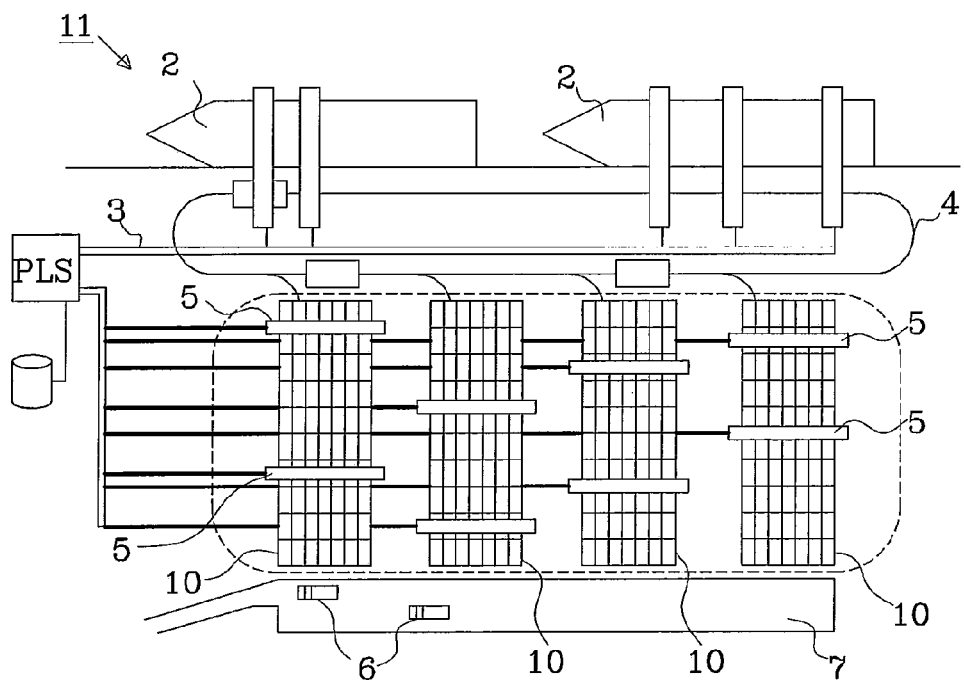
FIG. 1 shows an overview of a container port.

FIG. 1 shows a port 11 provided with a prior art port logistics system PLS that controls all movements of container blocks in the port. Ships 2 arrive to unload or load containers 1, and the containers are stored, in this embodiment, in four blocks 10. The PLS controls the cranes that unload/load the ships through a communication bus 3, and an unloaded container is brought from a ship via a transport rail 4 to a block selected by the PLS. Cranes 5 that are dedicated to a block, and controlled by the PLS, move the unloaded container into a suitable position within the block. A container that is going to be loaded onto a ship is collected by the cranes 5 and moved to the transport rail 4 to be transported to the ship 2. The PLS issues orders to each crane and these orders are arranged in a queue for each crane. The same applies when a truck 6 loads or unloads a container on the "landside" 7.

Figure 2:
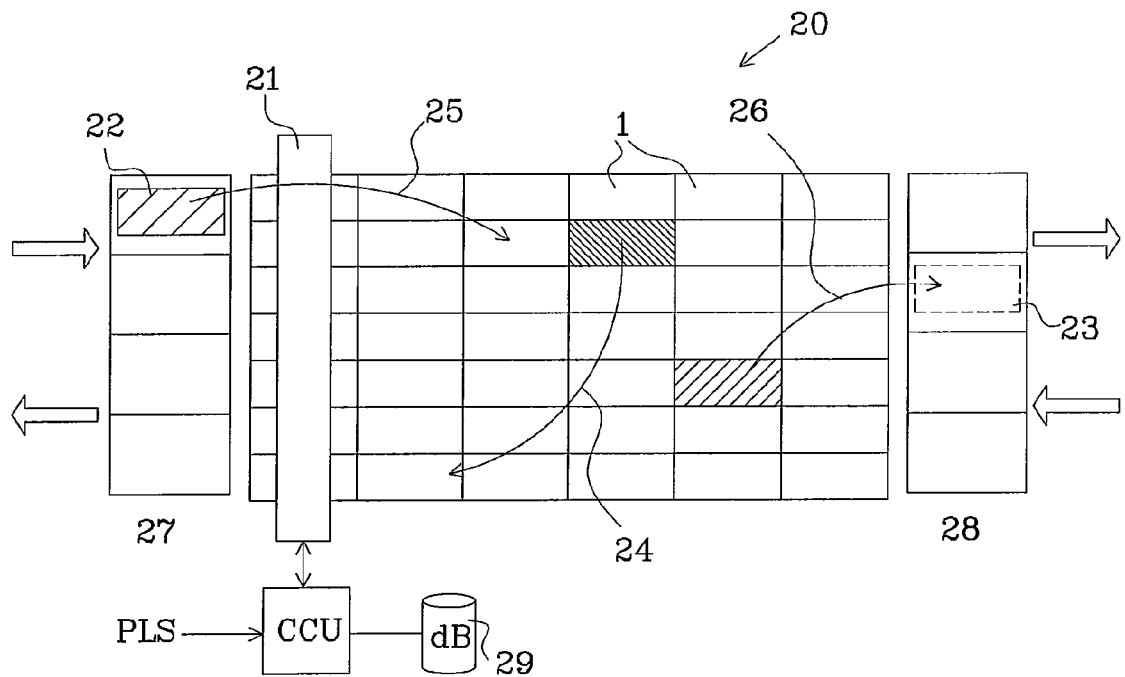
FIG. 2 shows a container block with one crane illustrating insert, removal and re-stacking operation according to the invention.

FIG. 2 shows a first embodiment of the present invention applied to a block 20 of a multiple containers 1 stacked in a three dimensional space. A single crane 21 is provided to move the containers within the block (re-stacking operation) as illustrated by the arrow 24, inserting a container into the block (insert operation) from an input position 22 as illustrated by the arrow 25, and removing a container from the block (removal operation) to an output position 23, as illustrated by the arrow 26. Input and output positions are provided outside the block 20 in a dedicated space 27 for the "landside" of the block, and a dedicated space 28 for the "seaside" of the block. A crane control unit (CCU) configured to communicate with the port logistics system (PLS) controls the movement of the crane by assigning container moves to a queue. The PLS informs the CCU of which block a container should be stored in and the CCU controls the handling of the containers within the block 20, and the insert and removal operations from the external dedicated spaces 27 and 28 in which the input position 22 and output position 23 are located. The CCU is provided with an internal memory or an external memory 29 is accessible to the CCU. Information regarding container identification, current position (CP) of each container, time-until-removal TUR, and desired output position (OUT) are stored in the memory 29. There are normally several output positions and input positions available in each external dedicated space 27 and 28.

It should be noted that the invention may be implemented for a sub-section 30, as described in connection with FIGS. 3a-3c of an entire block. A block may be dynamically divided into sub-sections dependent on the number of cranes and tasks assigned to each crane. This will become obvious from the description in connection with FIG. 4.

Figure 3A:
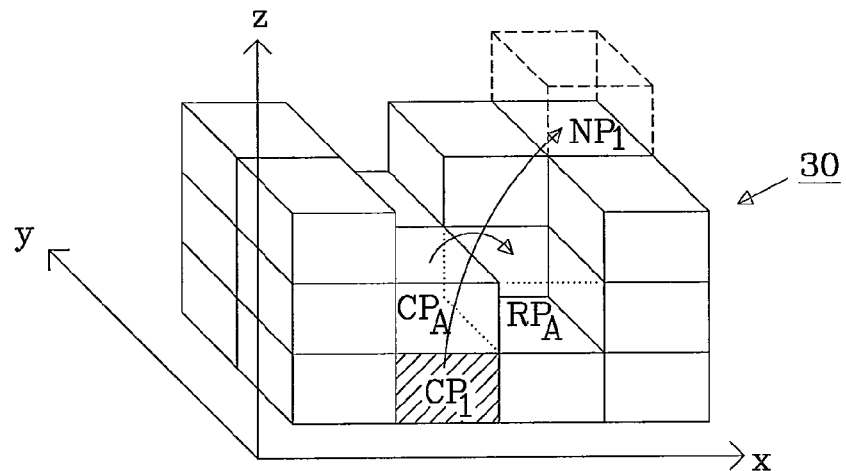
FIGS. 3*a*-3*c* illustrates a re-stacking operation according to the present invention.
Figure 3B:
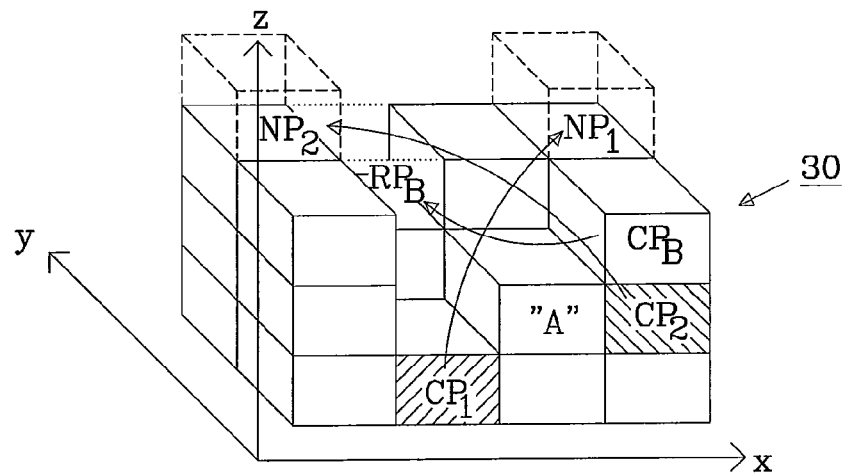
Figure 3C:
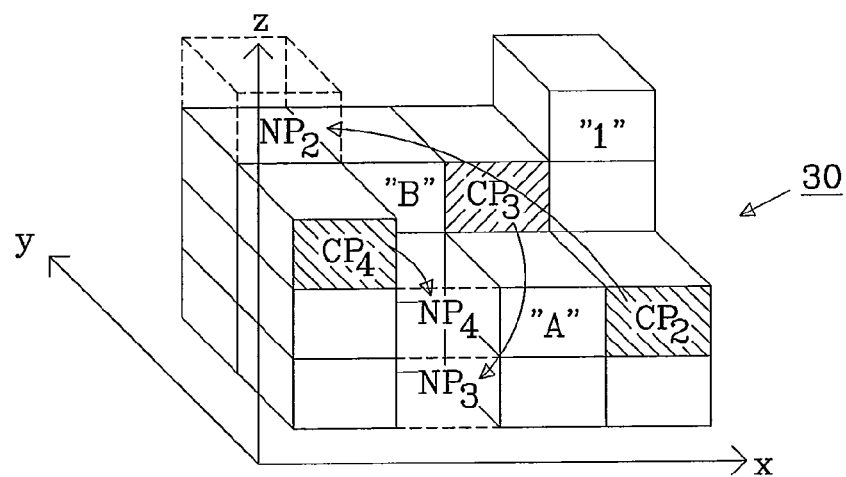

FIGS. 3a-3c illustrates a re-stacking operation according to the present invention. A sub-section 30 of the block 20 described in connection with FIG. 2 comprises in this embodiment twenty containers arranged in an area with two by four containers wherein the maximum height is four containers. A three dimensional space is created having thirty two available positions. A single crane (not shown) moves a container at the time as defined by the required container moves arranged in a queue. The queue comprises a number of calculated container moves to perform the re-stacking according to the invention.

Re-stacking is normally performed to put the containers within the sub-section at a more favorable position compared to the current position. This task is performed when there is no new container to be inserted into the sub-section 30, and when no container is to be removed from the sub-section 30. Insert and removal operation have priority over re-stacking operations and the process of re-stacking is preferably interrupted immediately when an order to insert or remove a container is received by the CCU from the PLS.

The principal operation of the re-stacking procedure is described in connection with FIGS. 3a-3c. Before the crane can start to move containers from their current position (CP) to a new position (NP), the CCU calculates a value R for each container present within the sub-section 30. The calculated value R is based on: time until removal (TUR) of the container from the block, and time for moving (TFM) the container from the current position (CP) to a selected external output position (OUT). A more detailed description of how to calculate the value R can be found below.

The calculated value R for each container is a measure of how optimal the current position of the container is compared to all other containers in the sub-section. A goal of the present invention is to reduce the sum of the calculated values R for all containers within the sub-section, and therefore the container with one of the highest values R is normally selected to be moved. FIG. 3a illustrates the case when container "1" at current position $CP_1$ is selected. Alternative positions (AP) are identified and a corresponding value $R_{new}$ is calculated for each AP to identify a new position $NP_1$ for the selected container "1", as marked with dashed lines. A more detailed description of how to calculate the value $R_{new}$ and select $NP_1$ from the plurality of AP can be found below.

In order to be able to move container "1" from its current position, container "A" positioned above container "1" needs to be relocated to a relocation position $RP_A$ from its current position $CP_A$, as shown in FIG. 3a. Available relocation positions (ARP) are identified and a corresponding $R_{relocate}$ is calculated for each ARP to identify the relocation position $RP_1$ for container "A", as marked with dotted lines. A more detailed description of how to calculate the value $R_{relocate}$ and select $RP_1$ from the plurality of ARP can be found below.

The required container moves are calculated and a queue of container moves is now created with the following appearance:

| Task | ID | Move |
|---|---|---|
| 1 | "A" | $CP_A$ -> $RP_A$ |
| 2 | "1" | $CP_1$ -> $NP_1$ |

This queue is assigned to the crane (only one crane present in this example) and the first task is initiated, i.e. to move container A from its current position to the selected relocation position. The CCU thereafter selects another container "2", preferably the container having the second highest value "R", which is positioned at $CP_2$ as illustrated in FIG. 3b. A new position $NP_2$ for container "2" is identified and selected, as marked with dashed lines. In order to be able to move container "2" from its current position, container "B" positioned above container "2" needs to be relocated to a relocation position $RP_B$ from its current position $CP_B$, as shown in FIG. 3b. The relocation position $RP_B$ is identified and selected for container "B", as marked with dotted lines The required container moves for moving container "2" from its current position $CP_2$ to the new position $NP_2$ are calculated:

| Calculated moves for container "2" | | |
| --- | --- | --- |
| Task | ID | Move |
| 1 | "B" | $CP_B$ -> $RP_B$ |
| 2 | "2" | $CP_2$ -> $NP_2$ |

These container moves could either be added in the end of the queued tasks for the crane, such as:

| Queue for crane | | | |
| --- | --- | --- | --- |
| Task | ID | Move | Status |
| 1 | "A" | $CP_A$ -> $RP_A$ | moving |
| 2 | "1" | $CP_1$ -> $NP_1$ | |
| 3 | "B" | $CP_B$ -> $RP_B$ | |
| 4 | "2" | $CP_2$ -> $NP_2$ | |

The status field indicates that the crane presently is busy with performing task 1.

In some circumstances it may be more efficient to rearrange the order of the tasks to take advantage of the cranes actual position after completing the task it presently is occupied with. In this case it may be more advantageous to rearrange the container moves for container "1" and "B". The aim of the rearranging is to minimize, or at least reduce, the required time to perform the tasks in the queue for the crane. This result in a modified queue of container moves assigned to the crane by the CCU.

| Modified queue for crane | | | |
| --- | --- | --- | --- |
| Task | ID | Move | Status |
| 1 | "A" | $CP_A$ -> $RP_A$ | moving |
| 2 | "B" | $CP_B$ -> $RP_B$ | |
| 3 | "1" | $CP_1$ -> $NP_1$ | |
| 4 | "2" | $CP_2$ -> $NP_2$ | |

When the task of moving container "A" has been completed, as illustrated in FIG. 3*b*, the crane performs the next task in the queue, i.e. first moving container "1" to its new position and thereafter moving container "B" to its relocation position, or first moving container "B" to its relocation position and thereafter moving container "1" to its new position dependent on which queue is assigned to the crane by the CCU.

At the same time as the crane performs the assigned tasks in the queue, the CCU continues to select containers to be moved to "optimize" the positions of the containers in the sub-section 30. Container "3" is selected to be moved from its current position CP3 to a new position NP3 and container "4" is selected to be moved from its current position CP4 to a new position NP4, as illustrated by the dashed lines in FIG. 3*c*. No other container needs to be moved in order to move the selected containers, but container "1" needs to be moved before container "3" can be moved into its new position NP3. Container "4" can not be moved into its new position NP4 until container "3" has been moved its new position NP3. As an example, the tasks in the queue for the crane are rearranged and the container moves for container "3" and "4" are added as follows:

| New queue for crane | | | | |
| --- | --- | --- | --- | --- |
| Task | ID | Move | Status | Comments |
| — | "A" | $CP_A$ -> $RP_A$ | done | ($RP_A$ is now $CP_A$ for container "A") |
| — | "B" | $CP_B$ -> $RP_B$ | done | ($RP_B$ is now $CP_B$ for container "B") |
| 1 | "1" | $CP_1$ -> $NP_1$ | moving | |
| 2 | "3" | $CP_3$ -> $RP_3$ | | |
| 3 | "2" | $CP_2$ -> $NP_2$ | | |
| 4 | "4" | $CP_4$ -> $NP_4$ | | |

The completed moves are preferably removed from the queue, but are included above to clarify which moves have been performed. FIG. 3*c* illustrates the positions of the container in the sub-section 30 after the completion of the move of container "1". The memory which is accessible to the CCU contains the current position of each container, and when the move is completed (as indicated by "done" in the status field), the current position of the moved containers are updated in the memory as indicated in the comments field.

The re-stacking operation continues until the sum of the calculated values R for all containers present within the sub-section 30 is minimized, or until the re-stacking operation is interrupted by an insert operation or removal operation.

In a preferred embodiment, the calculated value R is updated for each container that is affected by the move of the selected container to a new position before another container is selected. In the example illustrated in connection with FIGS. 3*a*-3*c*, the calculated value of the container positioned below the relocation position $RP_A$ for container "A" should be updated, as well as the calculated value for the containers positioned below the new position $NP_1$ for container "1". These updated values will increase as a result of the additional container on top. The updated values will then be taken into consideration when selecting the next container to be moved. It is possible that the next container will be a container positioned below the new position $NP_1$ for container "1", and that container needs to be moved before container "1" can be moved. These parameters are preferably taken into consideration when selecting the new position $NP_1$ for container "1" from the plurality of alternative positions, as described in more detail below.

Container parameters, such as $CP_i$, $TUR_i$, $OUT_i$, type, size, etc, are stored in the memory. The current position $CP_i$ of each container i is updated when the container is moved, but may also be updated regularly if the crane is provided with a means to verify the container ID when moving across the sub-section. Such a means may involve bar code reader system, transponder system, image recognition system, etc.

The calculated value R for a container is based on TUR and on a parameter "time for moving" (TFM), which is determined based on the current position and the output position. The current position and the output position are container parameters stored in the memory. TFM is calculated as the estimated time to move the selected container from its current position to a desired output position. Intermediately positioned containers between CP and OUT may affect the calculated TFM. It is preferred that TFM also is based on time for relocating (TFR) containers, such as container "A" and container "B" described in connection with FIGS. 3*a*-3*c*, to facilitate the move of the selected container.

Figure 4:
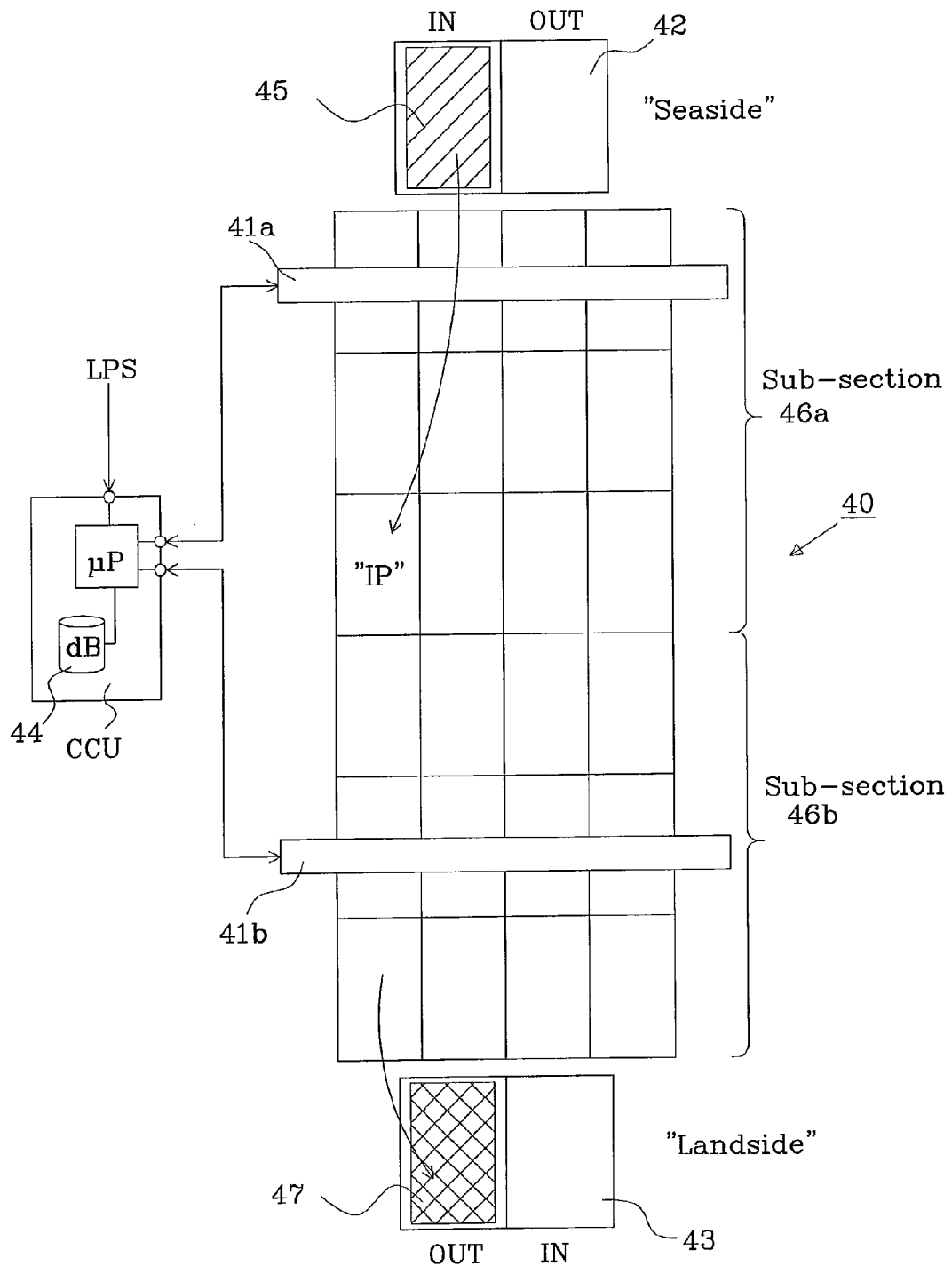
FIG. 4 shows a container block with two cranes illustrating insert, removal and re-stacking operation according to the invention.

FIG. 4 shows a top view of a block 40 serviced by two cranes 41a and 41b. An area 42, 43 not being a part of the block 40 is provided on each side of the block, each area is provided with an output position OUT and an input position IN. A crane control unit CCU, comprising a microprocessor µP and an internal memory 44, communicates with the cranes 41a and 41b.

An external command center EEC, such as a Port Logistics System, communicates with the CCU to initiate insert operation of a container into the block 40 using one of the available input positions, or to initiate a removal operation of a container from the block 40 to one of the available output positions. The optimization process of block 40 is described in connection with FIG. 5, wherein the process starts at step 50 when the optimization is initiated. In order to effectively optimize the position of the containers within a block it is necessary for the system to have knowledge of a parameter indicative of the suitability to position each container at a certain position within the block. A value R is therefore calculated in step 51, which reflects the time it takes to move each container to the correct output position from a position within the block (or sub-section if not the entire block is selected).

R is based on, as mentioned above, time until removal (TUR) of the container from the block, and time for moving (TFM) the container from the current position (CP) to a selected external output position (OUT). TUR and desired OUT is provided from PLS, or calculated, when the container is inserted. The PLS may also supply this information at a later stage (see below).

Furthermore, TFM may be based on the time for relocating (TFR) containers to facilitate the move of containers located below. TFM for a container being located beneath two containers will include TFR compared to a container situated on top of a stack of containers. TUR for most containers within a block is much higher than TFM, and TUR will therefore be an essential parameter for the optimization process.

The value R should be considered to be a cost function that is attached to each container representing the time it would take to transport this particular container from its current position to the position where it is most likely going to be removed from the block (preferably taking into account that other containers stacked on top of this one have to be removed first). Weights are thereafter introduced to give higher cost to containers that are due for delivery soon.

The value R is stored in a memory 44 arranged within the CCU and the process continue to step 52, in which CCU checks if there are any orders from the PLS to insert a container in the block 40 or to remove a container from the block. If there is an order to interrupt the re-stacking process, the process continues to step 53 in which the CCU determines the type of interrupt process. The steps associated with insert operation and removal operation is described below.

If no orders are received from the PLS, the process continues to step 62 to perform a re-stacking operation by selecting a container. The container having the highest value R (or cost function) is preferably selected. Alternative positions (APs) for the selected container is thereafter identified within the block, as described in connection with FIGS. 3a-3c, and a new value $R_{new}$ is calculated for each AP as the values R was calculated in step 51. A new position for the selected container is selected from the AP based on: the calculated value R for its CP, the calculated new value $R_{new}$ for its AP, and a travel cost (TC) based on time for moving the container from CP to each AP. TC is preferably further based on time for relocating containers to facilitate the move of the selected container to NP.

In a further embodiment, the selection of NP is based on reducing, preferably minimizing, a cost C for the selected container:

$$C=R_{new}(AP_n)-R(CP)+K_1*TC_n, \text{ where } n=1 \text{ to } N \quad (1)$$

R(CP) is the calculated value at the current position,
$R_{new}(AP_n)$ is the calculated new value at the nth alternative position
$K_1$ is a constant, preferably less than one ($K_1<1$)
$TC_n$ is the calculated travel cost for moving said selected container from the current position to the nth alternative position, and
N is the number of alternative positions available.

In an alternative embodiment, the selected container is the container that will decrease the sum of the value R for all containers when the selected container has been moved to NP. In that case a new value $R_{new}$ for every alternative position for all containers in the block needs to be calculated before a container can be selected. The calculations to find NP for each container in the block is performed as described above.

When a new position (NP) has been determined the process continues to step 63 in which necessary moves are calculated in order to be able to move the selected container from CP to NP. These moves may include relocating containers that are stacked on top of the selected container, etc. In order to select a suitable relocation position (RP) for a container that needs to be relocated, a value, cost function, $R_{relocate}$ has to be calculated for every available relocation positions (ARP), as described above. The calculation of $R_{relocate}$ is based on the same parameters as the calculation of R for all containers in step 51 and the selection of RP is described in more detail below.

When the moves have been calculated in step 63, the CCU create a queue in step 64 for each crane 41a, 41b to perform the tasks. If there are pending tasks in the queue, these may be taken under consideration when creating the queues, as described above in connection with FIGS. 3a-3c. It is also possible to rearrange tasks between the queues of the cranes, to further reduce the time needed to perform the tasks.

In step 65 the cranes perform the next task assigned to each queue and the process continues to step 66 in which the database containing the cost function R is updated. The calculated container moves will affect the calculated value R for some containers in the block. These values are preferably updated before the process continues to step 67. However, it is possible to omit step 66 in favor of including step 51 if another container should be selected, which is decided in step 67. If another container should be selected the process is fed back through arrow 69 to step 52 (unless step 66 was omitted, then the process is fed back to step 51). If no other container should be selected the process ends in step 68.

Insert Operations

Interrupt will appear when an order to initiate an insert operation of a new container 45 into the block 40 is received from the PLS. The order sent from the PLS comprises:
Container ID,
Input position (Seaside/landside) IN Furthermore, information regarding "time until removal" TUR and desired output position OUT may be included in the order to insert the container into the block. These container parameters are not essential to perform the insert operation, but the knowledge of TUR and OUT will improve future re-stacking operations of the block since the new container 45 may be positioned in a more favorable position during the insert operation. TUR is preferably estimated using the stored TUR for containers located within the block 40 if the TUR for the container to be inserted is unknown to the system, and the estimated value is stored in the memory 44. The estimation is calculated as an average value of the stored TUR for containers within the block 40. If OUT is not provided in the order to insert the container, OUT is preferably selected to be a central position of the block 40. The PLS may naturally update TUR and OUT for a given container at any time before it has been removed from the block 40.

An insert position is selected by the CCU based on a calculated value $R_{insert}$ for each available insert position (AIP) in the block, and a calculated travel cost (TC). $R_{insert}$ is based on the same parameters as the value R, see above, with the exception that TFM is selected to be the time for moving the container from each AIP to the OUT. TC is based on the time for moving the new container from the external input position (IN) to each AIP.

The insert position (IP) for the new container may further be selected based on an updated calculated value R for each container affected by inserting the container at each AIP, and with the aim of minimizing the sum of the updated calculated values R and the insert value $R_{insert}$ for the selected IP.

In an alternative embodiment, the selection of the insert position (IP) is based on reducing (preferably minimizing) a cost $C_{insert}$ for the inserted container:

$$C_{insert} = R_{insert}(AIP_r) + K_3 * TC_r, \text{ where } r=1 \text{ to } R \quad (2)$$

wherein:
$R_{insert}(AIP_r)$ is the calculated insert value at the rth available insert position,
$K_3$ is a constant, preferably higher than one ($K_3>1$)
$TC_r$ is the calculated travel cost for moving the additional container from the current position to the rth available insert position, and
R is the number of available insert positions.

This may be exemplified with reference to FIG. 4. An order to insert container 45 from the external input position IN at the "seaside" is received from PLS to CCU and the re-stacking operation is interrupted. Each crane has a queue of tasks to perform, as described in connection with FIGS. 3a-3c. The system is preferably configured to prioritize the insert operation and the tasks in the crane 41a, operating at the "seaside", will only be performed until the CCU has selected an IP. The queue assigned to crane 41b is not affected by the insert operation, and the block may be considered to be divided into dynamical sub-sections 46a and 46b. Each crane service a sub-section of the block 40, which sub-sections may be overlapping.

The insert position is selected, as described above, and the tasks in the queue assigned to crane 41a are rearranged to include the moves required to insert the new container at IP as fast as possible. Tasks assigned to crane 41b needs to be taken into consideration when rearranging the tasks in the queue for crane 41a to avoid unnecessary delay and risk for collision between the cranes.

Figure 5:
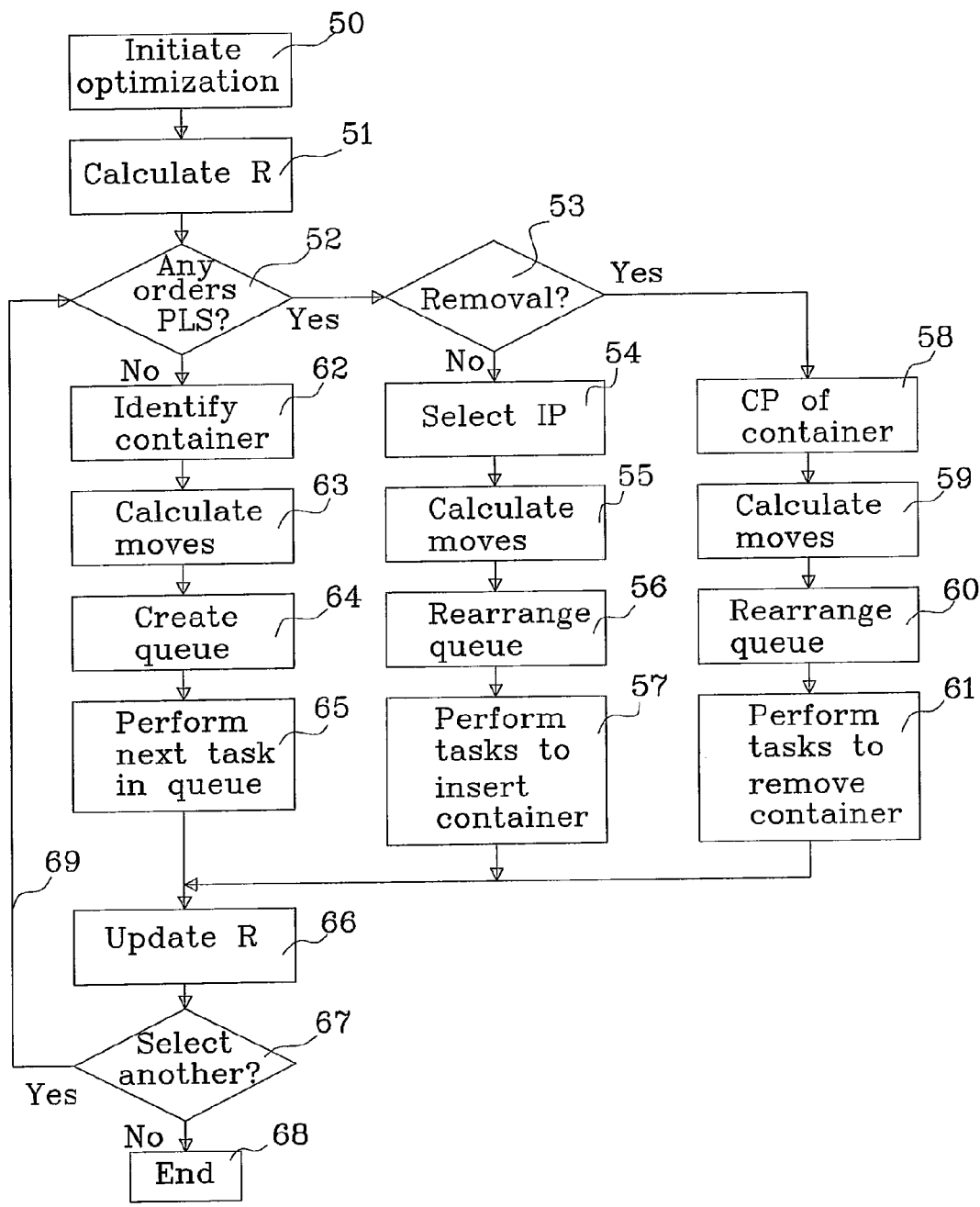
FIG. 5 is a flow chart of the process for insert, removal and re-stacking operation according to the invention.

The process initiated by the order to insert a container is described in connection with FIG. 5 and comprises:
Selecting an insert position (IP), step 54,
calculating the number of container moves required facilitating the move of the container to be inserted from the external input position (IN) to an insert position (IP) within the sub-section of said block, step 55,
introducing the required number of container moves in the queue for each crane, step 56, and
performing the container moves as arranged in the queue by controlling said at least one crane, step 57.

The moves required inserting the container in the block are preferably prioritized in the queue in step 56. The container moves performed in step 57 are preferably carried out until the container has been inserted in the block 40 before the process continues to step 66 and the value R is updated and stored in the memory 44 for each affected container within the block.

Removal Operations

Interrupt will also appear when an order to initiate a removal operation of a container 47 within the block 40 is received from the PLS. The order sent from the PLS comprises:
Container ID,
Output position (Seaside/landside) OUT No other information is needed for CCU to be able to calculate the moves necessary to remove the selected container from the block to the correct output position OUT. It should be noted that the previously stored desired output position may differ from the output position contained in the order to remove the container. If the selected container is positioned below another container within the block, this container needs to be removed to a relocation position. This procedure is similar to the procedure required to move container within the block during re-stacking operations, as described in connection with FIGS. 3a-3c. The selection of a relocation position (RP) will affect the future re-stacking operations that will commence as soon as the interrupt operation has been completed. A more detailed description of how to select a suitable RP can be found below.

The process initiated by the order to remove a container is described in connection with FIG. 5 and comprises the steps after step 53:
determining the current position (CP) of the container to be removed from the block, step 58,
calculating a number of container moves required facilitating the move of the container to be removed, preferably including relocating any containers arranged above the container to be removed to a respective relocation position (RP), and moving the container to be removed to the selected external output position (OUT), step 59,
introducing the required number of container moves in the queue for one or both cranes (if necessary), step 60, and
performing the container moves as arranged in the queue by controlling each crane, step 61.

The moves required removing the container from the block are preferably prioritized in the queue in step 60, and the selection of RP for each container that needs to be relocated in step 59 is based on a calculated relocation value (Rrelocate) for available relocation position (ARP) as described in more detail above. The container moves performed in step 61 are preferably carried out until the container has been removed from the block 40 before the process continues to step 66 and the value R is updated and stored in the memory 44 for each affected container within the block.

In an alternative embodiment the relocation position (RP) is based on reducing, preferably minimizing, a cost Crelocate for each additional container:

$$C_{relocate} = R_{relocate}(ARP_m) - R(CP) + K_2 * TC_m, \text{ where } m=1 \text{ to } M \quad (3)$$

wherein:
R(CP) is the calculated value at the current position,
$R_{relocate}(ARP_m)$ is the calculated relocation value at the mth available relocation position
$K_2$ is a constant, preferably higher than one ($K_2>1$)
$TC_m$ is the calculated travel cost for moving the additional container from the current position to the mth available relocation position, and
M is the number of available relocation positions.

The aim of the optimization is to reduce the sum of the calculated values R (cost function) for all containers present within each block, or a sub-section of the block. The described process is preferably implemented as a computer program configured to perform, when executed on a computer, an optimization of the position of a plurality of containers in a block, or sub-section. A computer-readable medium is preferably encoded with the computer program.

The invention also relates to a system for optimizing the position of a plurality of containers in a block (or sub-section of a block). The system is adapted to control at least one crane 21; 41a, 41b configured to move said containers within said block (or sub-section) and is further provided with a crane control unit CCU that is configured to perform the optimization process.

What is claimed is:

1. A method for optimizing the position of a plurality of containers in a block in a port provided with a port logistics system (PLS), comprising: providing at least one crane configured to move said containers within said block and a crane control unit for controlling said at least one crane and configured to communicate with the port logistics system (PLS), in which the following steps are performed:
   A identifying a selected container (i) to be moved from a current position (Cp) within a sub-section of said block to a new position (NP) within the sub-section;
   B calculating a number of container moves required facilitating the move of the selected container in step A;
   C arranging the required number of container moves in a queue for each crane;
   D performing the container moves as arranged in the queue by controlling said at least one crane, wherein the step of performing the container moves involves relocating additional containers other than the selected container to facilitate the move to the new position (NP), such that each additional container is relocated to a relocation position (RP).

2. The method of claim 1, wherein said method further comprises:
   E repeating steps A-E for another selected container within the sub-section.

3. The method of claim 2, wherein step C further comprises rearranging the container moves in the queue to reduce required time to perform the container moves in the queue of each crane.

4. The method of claim 3, wherein the aim of step C is to minimize the required time to perform the container moves in the queue of each crane.

5. The method of claim 3, wherein the sub-section is serviced by two cranes connected to the crane control unit (CCU), and step C further comprises rearranging the container moves between the queues of the cranes.

6. The method of claim 1, wherein the method comprises selecting the sub-section to constitute the entire block.

7. A computer program configured to perform the method of claim 1 on a computer readable medium, wherein said computer program, when executed on a computer, optimizes the position of a plurality of containers in a block, or sub-section of a block.

8. A computer-readable medium encoded with the method of claim 7.

9. A system for optimizing the position of a plurality of containers in a block in a port provided with port logistics system (PLS), said system being adapted to control at least one crane configured to move said containers within said block, characterized in that said system comprises a crane control unit (CCU) for controlling said at least one crane, configured to communicate with the port logistics system (PLS), that is configured to perform the method of claim 1.

10. The method of claim 1, wherein the additional containers are arranged above the selected container, and wherein the additional containers are moved to a selected external output position (OUT).

11. The method of claim 1, wherein the port logistics system (PLS) controls movement of the container blocks in the port.

12. A method for optimizing the position of a plurality of containers in a block, comprising: providing at least one crane configured to move said containers within said block and a crane control unit in which the following steps are performed:
   A identifying a selected container (i) to be moved from a current position (Cp) within a sub-section of said block to a new position (NP) within the sub-section;
   B calculating a number of container moves required facilitating the move of the selected container in step A;
   C arranging the required number of container moves in a queue for each crane; and
   D performing the container moves as arranged in the queue by controlling said at least one crane;
   wherein the identification in step A is performed by:
   a) determining the current position (CP) of each container within a sub-section of said block;
   b) calculating a value (R) for each container in said sub-section based on:
      a time until removal (TUR) of the container from the block, and
      a time for moving (TFM) the container from the current position (Cp) to a selected external output position (OUT);
   c) identifying a number of alternative positions (AP's) within the sub-section for a selected container;
   d) calculating a new value ($R_{new}$) for the selected container based on the same parameters as the calculated value (R) in step b) for each alternative position (AP); and
   e) selecting a new position (NP) for the container from the number of alternative positions (AP's), based on:
      the calculated value (R) for its current position (Cp),
      the calculated new values ($R_{new}$) for its alternative positions (AP's), and
      a calculated travel cost (TC) based on time for moving said container from the current position (Cp) to each alternative position (AP).

13. The method of claim 12, wherein said method further comprises:
   f) updating the calculated value (R) for each container affected by the move of the selected container to the new position (NP).

14. The method of claim 12, wherein the travel cost (TC) in step e) is further based on time for relocating containers to facilitate the move of the selected container to the new position (NP).

15. The method of claim 12, wherein the new position (NP) in step e) is further selected based on reducing a cost C for the selected container:

$$C = R_{new}(AP_n) - R(CP) + K_1 * TC_n, \text{ where } n=1 \text{ to } N$$

wherein:
R(CP) is the calculated value at the current position,
$R_{new}(AP_n)$ is the calculated new value at the nth alternative position,
$K_1$ is a constant, preferably less than one ($K_1 < 1$),
$TC_n$ is the calculated travel cost for moving said selected container from the current position to the nth alternative position, and
N is the number of alternative positions available.

16. The method of claim 15, wherein the selection in step e) is further based on minimizing the cost C for the selected container.

17. The method of claim 12, wherein step c) further comprises selecting a container based on the calculated value (R) prior to identifying a number of alternative positions in step c).

18. The method of claim 17, wherein the container with the highest value (R) is selected in step c).

19. The method of claim 12, wherein said time for moving (TFM) is further based on a time for relocating (TFR) containers to facilitate the move of the selected container in step b) and step d).

20. The method of claim 12, wherein the method further comprises relocating additional containers other than the selected container to facilitate the move to the new position (NP) and each additional container is relocated to a relocation position (RP).

21. The method of claim 20, wherein the relocation position (RP) for each additional container is selected based on the same parameters as the selection of the new position in step e) for available relocation positions (ARP's) and a calculated relocation value ($R_{relocate}$) for each available relocation position (ARP) based on the same parameters as the calculated value (R) in step b) for each available relocation position (ARP).

22. The method of claim 12, wherein the time until removal (TUR) for each container is given to the crane control unit (CCU) when each container enters the block, or the time until removal (TUR) is estimated using the stored time until removal (TUR) for the containers within the block if the time until removal for a container to be inserted is unknown when the container enters the block.

23. The method of claim 22, wherein said estimation of the time until removal (TUR) is an average value of the stored time until removal for the containers within the block accessible to the crane control unit (CCU).

24. The method of claim 12, wherein step a) comprises retrieving the current position (CP) of each container from a memory (DB) accessible to said crane control unit (CCU), said memory (DB) further comprises the latest calculated value (R) for each container at the current position (CP).

25. The method of claim 24, wherein the method further comprises confirming and updating the current position (CP) of each container in the memory (DB) each time a container is moved by retrieving the identity of the container.

26. The method of claim 12, wherein the aim of the optimization is to reduce the sum of the calculated values (R) for all containers present within the sub-section.

27. A method for optimizing the position of a plurality of containers in a block, comprising: providing at least one crane configured to move said containers within said block and a crane control unit in which the following steps are performed:
A identifying a selected container (i) to be moved from a current position (Cp) within a sub-section of said block to a new position (NP) within the sub-section;
B calculating a number of container moves required facilitating the move of the selected container in step A;
C arranging the required number of container moves in a queue for each crane; and
D performing the container moves as arranged in the queue by controlling said at least one crane;
wherein the optimization is interrupted when an order to remove a container from the block to a selected external output position (OUT) is received from an external command center (PLS), and the following steps are performed by the crane control unit (CCU) before the process restarts at step A):
F determining the current position (CP) of the container to be removed from the block;
G calculating a number of container moves required to facilitate the move of the selected container in step F;
H introducing the required number of container moves in the queue for each crane; and
performing the container moves as arranged in the queue by controlling said at least one crane.

28. The method of claim 27, wherein the moves required to remove the container from the block are prioritized in the queue.

29. The method of claim 27, wherein the calculation in step G is based on:
g) relocating any containers arranged above the container to be removed to a respective relocation position (RP), and h) moving the container to be removed to the selected external output position (OUT).

30. The method of claim 29, wherein the relocation position (RP) for each additional container in step h) is selected based on the same parameters as the selection of the new position in step e) for all available relocation positions (ARP's) and a calculated relocation value ($R_{relocate}$) for each available relocation position (ARP) based on the same parameters as the calculated value (R) in step b) for each available relocation position (ARP).

31. The method of claim 30, wherein the relocation position (RP) in step h) further is selected based on reducing a cost C for each additional container:

$$C = R_{relocate}(ARP_m) - R(CP) + K_2 * TC_m, \text{ where } m=1 \text{ to } M$$

wherein:
R(CP) is the calculated value at the current position,
$R_{relocate}(ARP_m)$ is the calculated relocation value at the mth available relocation position,
$K_2$ is a constant, preferably higher than one ($K_2 > 1$),
$TC_m$ is the calculated travel cost for moving the additional container from the current position to the mth available relocation position, and
M is the number of available relocation positions.

32. A method for optimizing the position of a plurality of containers in a block, comprising: providing at least one crane configured to move said containers within said block and a crane control unit in which the following steps are performed:
A identifying a selected container (i) to be moved from a current position (Cp) within a sub-section of said block to a new position (NP) within the sub-section;
B calculating a number of container moves required facilitating the move of the selected container in step A;
C arranging the required number of container moves in a queue for each crane; and
D performing the container moves as arranged in the queue by controlling said at least one crane;
wherein the optimization is interrupted when an order to insert a container into the block from an external input position (IN) is received from an external command center (PLS), and the following steps is performed before the process restarts at step A):
J calculating the number of container moves required to facilitate the move of the container to be inserted from the external input position (IN) to an insert position (IP) within the sub-section of said block;
K introducing the required number of container moves in the queue for each crane; and L performing the container moves as arranged in the queue by controlling said at least one crane.

33. The method of claim 32, wherein the moves required to insert the container into the block are prioritized in the queue.

34. The method of claim 32, wherein the insert position (IP) for the container in step J is selected based on:
available insert positions (AIP's),
a value ($R_{insert}$) for each available insert position (AIP) based on the same parameters as the calculated value (R) in step b) for each available insert position (AIP), and
a calculated travel cost (TC) based on time for moving said container from the external input position (IN) to each available insert position (AIP).

35. The method of claim 34, wherein the insert position (IP) for the container in step J further is selected based on:
the updated calculated value (R) for each container affected by inserting the container at each available insert position (AIP), and
the aim of minimizing the sum of the updated calculated values (R) and the insert value ($R_{insert}$) for the selected insert position (IP).

36. The method of claim 35, wherein the insert position (IP) in step J) is further selected based on reducing a cost $C_{insert}$ for the inserted container:

$$C_{insert}=R_{insert}(AIP_r)+K_3*TC_r, \text{ where } r=1 \text{ to } R$$

wherein
$R_{insert}(AIP_r)$ is the calculated insert value at the rth available insert position,
$K_3$ is a constant, preferably higher than one ($K_3>1$),
$TC_r$ is the calculated travel cost for moving the additional container from the current position to the rth available insert position, and
R is the number of available insert positions.

* * * * *